(12) United States Patent
Hofmann et al.

(10) Patent No.: US 6,251,019 B1
(45) Date of Patent: Jun. 26, 2001

(54) CONSTANT VELOCITY PLUNGING JOINT WITH ANTI-DISMANTLING MEANS

(75) Inventors: Norbert Hofmann, Ronneburg; Michael Ricks, Nidderau, both of (DE)

(73) Assignee: GKN Lobro GmbH (DE)

( * ) Notice: Subject to any disclaimer, the term of this patent is extended or adjusted under 35 U.S.C. 154(b) by 0 days.

(21) Appl. No.: 09/305,168

(22) Filed: May 4, 1999

(30) Foreign Application Priority Data

May 4, 1998 (DE) .............................................. 198 19 615

(51) Int. Cl.[7] ...................................................... F16D 3/26
(52) U.S. Cl. ............................ 464/111; 464/124; 464/905
(58) Field of Search .................................. 464/111, 112, 464/113, 115, 114, 120, 121, 123, 122, 124, 162, 167, 905, 906, 145, 146, 143, 142

(56) References Cited

U.S. PATENT DOCUMENTS

| | | | |
|---|---|---|---|
| 3,362,193 | * 1/1968 | Ritsema | 464/111 |
| 3,664,152 | * 5/1972 | Macielinski | 464/143 |
| 3,875,762 | * 4/1975 | Tampalini | 464/142 |
| 4,196,598 | * 4/1980 | Hirai et al. | 464/111 |
| 4,338,796 | * 7/1982 | Orain | 464/111 |
| 4,507,100 | * 3/1985 | Dore et al. | 464/111 |
| 4,605,384 | * 8/1986 | Kurzeja et al. | 464/111 |
| 4,941,862 | * 7/1990 | Hazebrook et al. | 464/141 |

* cited by examiner

Primary Examiner—Lynne H. Browne
Assistant Examiner—Kenneth Thompson

(57) ABSTRACT

A constant velocity plunging joint is disclosed that includes an outer joint part having a cylindrical hollow chamber with an aperture at a first end, which cylindrical hollow chamber, at its other end, is closed by a base and in which there are formed uniformly circumferentially distributed, longitudinally extending tracks; an inner joint part which is positioned centrally in the cylindrical hollow chamber of the outer joint part so as to be angularly movable and longitudinally displaceable; and torque transmitting elements which, in the direction of rotation, are form-fittingly connected to the inner joint part and which, in the direction of rotation, engage the tracks of the outer joint part form-fittingly and so as to roll therein in the longitudinal direction; wherein, at the open end of the outer joint part, the end face is provided with caulkings which form raised portions reducing the free inner cross-section of the -cylindrical hollow chamber; wherein an assembly consisting of the inner joint part and the torque transmitting elements can be introduced through the aperture into the hollow chamber while temporarily deforming the raised portions; and wherein the raised portions apply an axial holding force to the assembly consisting of the inner joint part and of the torque transmitting elements, which axial holding force effectively acts against any automatic dismantling.

4 Claims, 5 Drawing Sheets

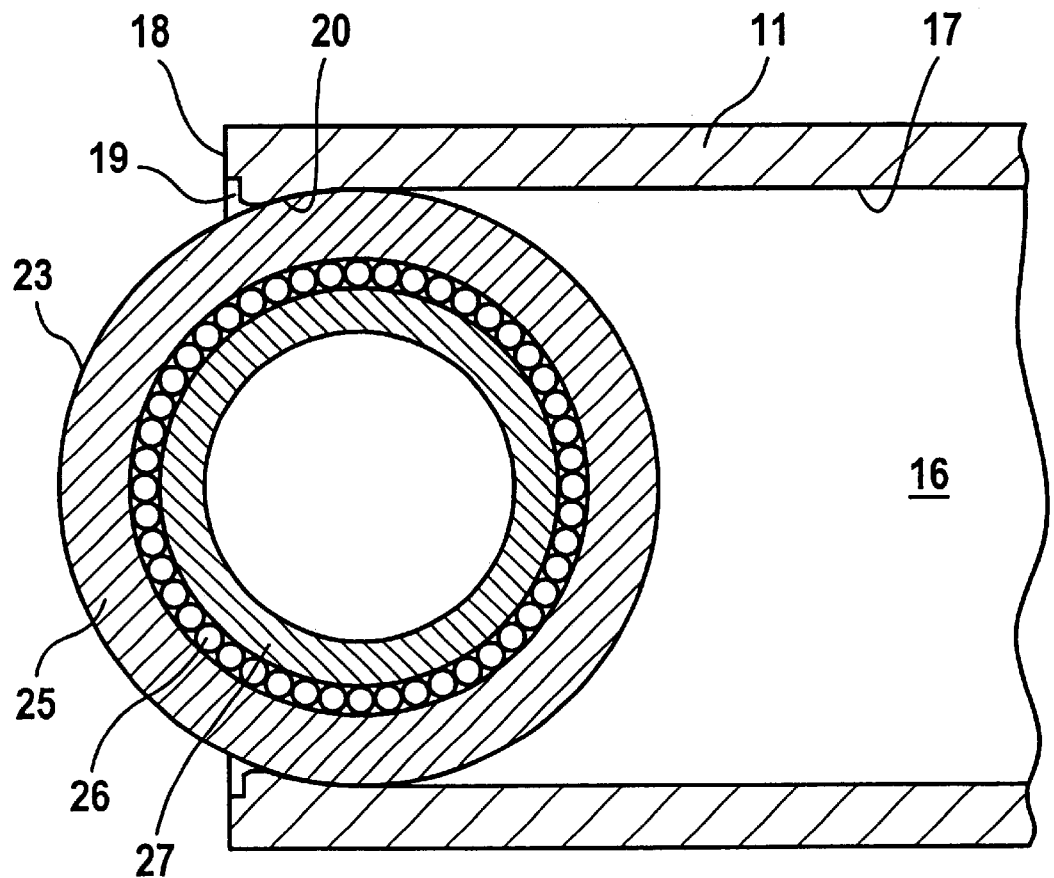
Fig. 3 (A-A)

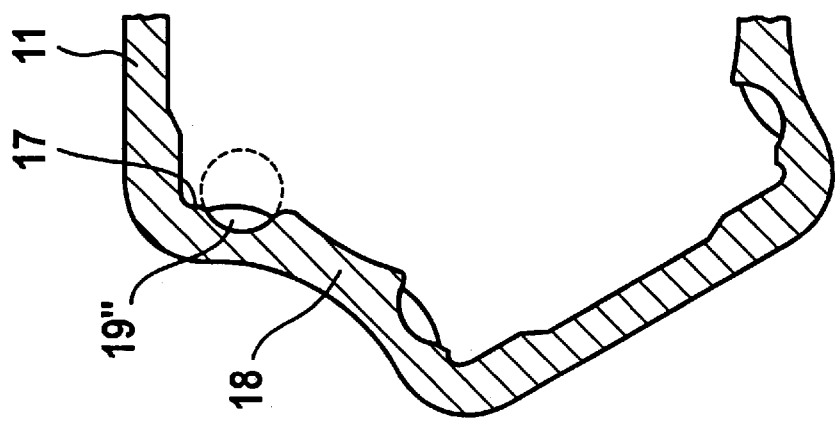
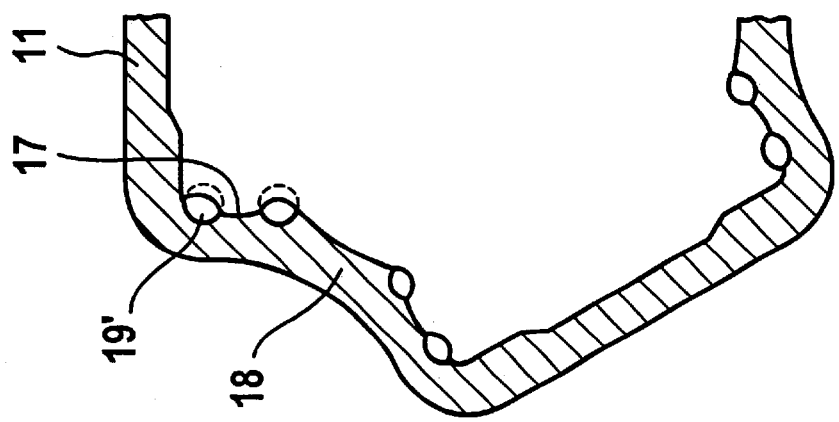
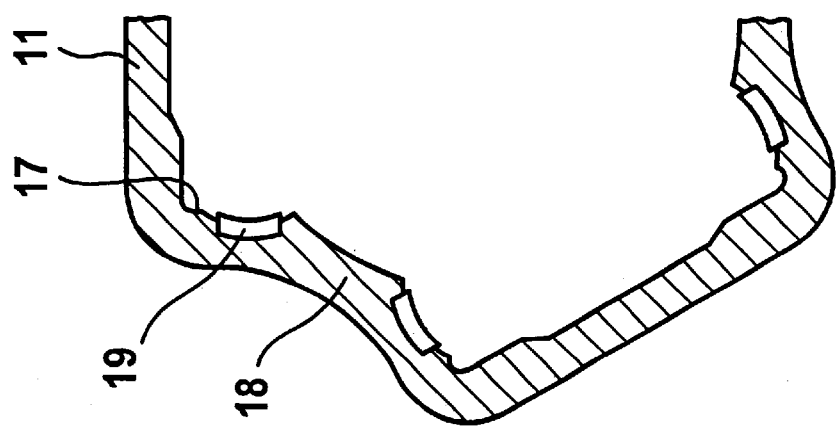

CONSTANT VELOCITY PLUNGING JOINT WITH ANTI-DISMANTLING MEANS

BACKGROUND OF THE INVENTION

The invention relates to a constant velocity plunging joint generally comprising an outer joint part having a cylindrical hollow chamber with an aperture at one end, which cylindrical hollow chamber, at its other end, is closed by a base and in which there are formed uniformly circumferentially distributed, longitudinally extending tracks; an inner joint part which is positioned centrally in the cylindrical hollow chamber of the outer joint part so as to be angularly movable and longitudinally displaceable; and torque transmitting elements which, in the direction of rotation, are form-fittingly connected to the inner joint part and which, in the direction of rotation, engage the tracks of the outer joint part form-fittingly so as to roll therein in the longitudinal direction.

Joints of the above described type are used by the joint manufacturers to complete a driveshaft comprising a shaft shank and two joints adjoining same, with the joints being filled with grease and being sealed by convoluted boots relative to the shaft shank. The first joint is a plunging joint of the species described and the second joint usually constitutes a fixed joint. The finished driveshafts are delivered to the vehicle manufacturer, with attaching journals at the plunging joint being inserted into a differential drive and secured therein, while, subsequently, attaching parts of the fixed joint are connected to the wheel hubs.

As these operations cannot take place simultaneously, i.e. first the differential drive with the connected plunging joint is mounted on the vehicle, while the fixed joint cannot be connected to the wheel hubs until later, there arises a situation in the course of the assembly of the vehicle wherein only the plunging joint is mounted while the angled driveshaft with the fixed joint is in a condition where it is freely and oscilatingly suspended. In spite of the relative sluggishness of the plunging joint, which is filled with grease and not yet run in, the weight of the suspended driveshaft with fixed joint may cause the plunging joint to become axially extended until it is finally disconnected inside the convoluted boot. Thereafter, the inner part of the plunging joint cannot be re-introduced into the outer part of the plunging joint until after the removal of the convoluted boot, i.e. the driveshaft has have to be removed and returned to the manufacturer.

Constant velocity joints of a similar type, but comprising a continuous cylindrical hollow chamber which is open at both ends, are already known to be provided with caulkings on the end face at one of the open ends of the outer joint part, these caulkings form raised portions which reduce the free cross-section of the tracks. In accordance with their function, in the form of an anti-dismantling means, they form an insurmountable obstacle to passage of the assembly consisting of the inner joint part and torque transmitting elements through the end face where they are located.

However, in such assemblies it is possible to axially introduce the assembly consisting of the inner joint part and torque transmitting elements from the other open end of the outer joint part, which end retains the free undeformed inner cross-section, i.e., no caulkings, with this open end being closed only subsequently by a cover or flanges which are bolted on or welded on.

It is obvious that with joints of the species of the initially mentioned type with a hollow chamber which is closed at one end by a base, it is not possible to provide caulkings of the type described above in the course of the production of the outer joint part. Therefore, such joints have so far been provided with additional securing elements in the form of sheet metal caps which are rolled into the outer joint part or pressed on to the outer joint part and which, after the assembly consisting of the inner joint part and torque transmitting elements has been axially introduced into the outer joint part, have to be secured to the latter, thus requiring a complicated production measure to be carried out on the partially assembled joint. When, at a later stage, the joint has to be dismantled for maintenance purposes, destruction of the securing elements is unavoidable.

It is therefore the object of the invention to provide plunging joints which are provided with simpler means for preventing unintentional dismantling.

SUMMARY OF THE INVENTION

In accordance with the invention, the objective is achieved in that, at the open end of the outer joint part, the end face is provided with caulkings which form raised portions reducing the free inner cross-section of the cylindrical hollow chamber; that the assembly consisting of the inner joint part and the torque transmitting elements can be introduced through the aperture into the hollow chamber while deforming the raised portions; and that the raised portions apply an axial holding force to the assembly consisting of the inner joint part and of the torque transmitting balls, which axial holding force effectively acts against any self-acting dismantling. Caulkings designed according to the present invention thus permit the assembly consisting of the inner joint part and torque transmitting elements to be assembled in a damage-free way through the outer joint part aperture, which is narrowed by caulkings, with the assembly undergoing only permissible elastic deformation. In an advantageous embodiment, the inventive design of the raised portions also permits subsequent dismantling of the joint for the purpose of maintaining the joint or replacing a convoluted boot in a non-destructive way.

According to a first embodiment, the raised portions are formed of a permanently hardened material and are elastically and plastically deformed when the assembly consisting of the outer joint part and the torque transmitting elements is first introduced. Said embodiment is advantageous in that when the joint is first assembled it is calibrated, so that independently of the tolerances of the respective inner joint part, it is possible to set a substantially fixed, permanent holding force. Initially, the caulkings can be less accurate, so that during the first introduction stage, a certain amount of plastic deformation takes place. The subsequent elastic return of the material determines the holding forces.

According to a second embodiment it is proposed that the raised portions, after having been formed by the caulkings, are hardened and are deformed only elastically when the assembly consisting of the inner joint part and the torque transmitting elements is first introduced. Only non-destructive elastic deformation takes place at the raised portions and at the assembly. The caulkings, prior to being hardened, have to be produced relatively accurately. Optionally, a chip-forming machining operation can take place after the hardening stage, and again, optionally, the caulking operation could, initially, be followed by a plastic deformation operation carried out by a gauge, whereafter the harding operation would take place.

The type of caulkings and the subsequently obtained raised portions largely depend on the track shape. The raised portions are preferably positioned inside the cross-sections of the tracks and especially in the running faces of same, so that they co-operate directly with rolling members. In a preferred embodiment, one single raised portion of an approximately uniform height is produced at the end of each track, or several individual raised portions of identical heights are produced at the end of each track.

According to a first embodiment, it is proposed that the joint is a tripode joint wherein the tracks constitute recesses with two opposed running faces and wherein the torque transmitting elements are tripode rollers supported on tripode arms of the inner joint part, and that, at least on one running face of each recess, there is provided a caulking. This embodiment includes prior art tripode joint designs which will not be explained in greater detail here.

According to a second embodiment it is proposed that the joint is a universal ball joint wherein the tracks are approximately semi-circular ball grooves and wherein the torque transmitting elements are balls guided in the ball grooves in the outer joint part and in ball grooves of the inner joint part and held by a cage in a common plane, and that caulkings are provided at least on three of the ball grooves. This embodiment also includes prior art axially plungeable universal ball joints, for example DO-joints wherein the cage is controlled by axially offset spherical faces of the cage, with the ball grooves being completely axis-parallel, or also VL-joints which comprise pairs of outer and inner ball grooves intersecting one another, with the balls being set so as to move directly on half the axial plunging path and on the angle-bisecting plane respectively.

The inventive embodiment which acts to prevent automatic dismantling of the joint has holding forces that are at least as great as the weight forces of the assembly consisting of the inner joint part and the torque transmitting elements and the weight forces of all the driveshaft parts connected to said assembly, i.e. the boot, the driveshaft and the complete second joint, plus the impact forces known to occur during transport and assembly. Dismantling as a result of incorrect handling is not excluded and has to be accepted. The assembly consisting of the inner joint part and the torque transmitting elements must not be damaged by the raised portions during assembly or dismantling operations.

Preferred embodiments of the invention with modifications in the region of the caulkings and a device for producing the caulkings will be described below with reference to the drawings.

BRIEF DESCRIPTION OF THE DRAWINGS

FIG. 3 is a partial cross sectional view along line A—A of FIG. 1.

FIG. 4a is a partial cross section through an outer joint part designed according to the embodiment shown in FIG. 3 in the region of a set of caulkings.

FIG. 4b is a further modification of the caulkings shown in FIG. 4a.

FIG. 4c is an additional modification of the caulkings shown in FIG. 4a.

DETAILED DESCRIPTION OF THE PREFERRED EMBODIMENT

Figure 2:
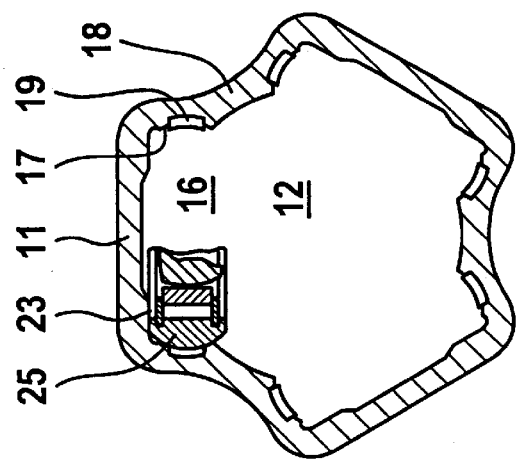
FIG. 2 is part of a cross-section through a joint designed according to FIG. 1.
Figure 1:
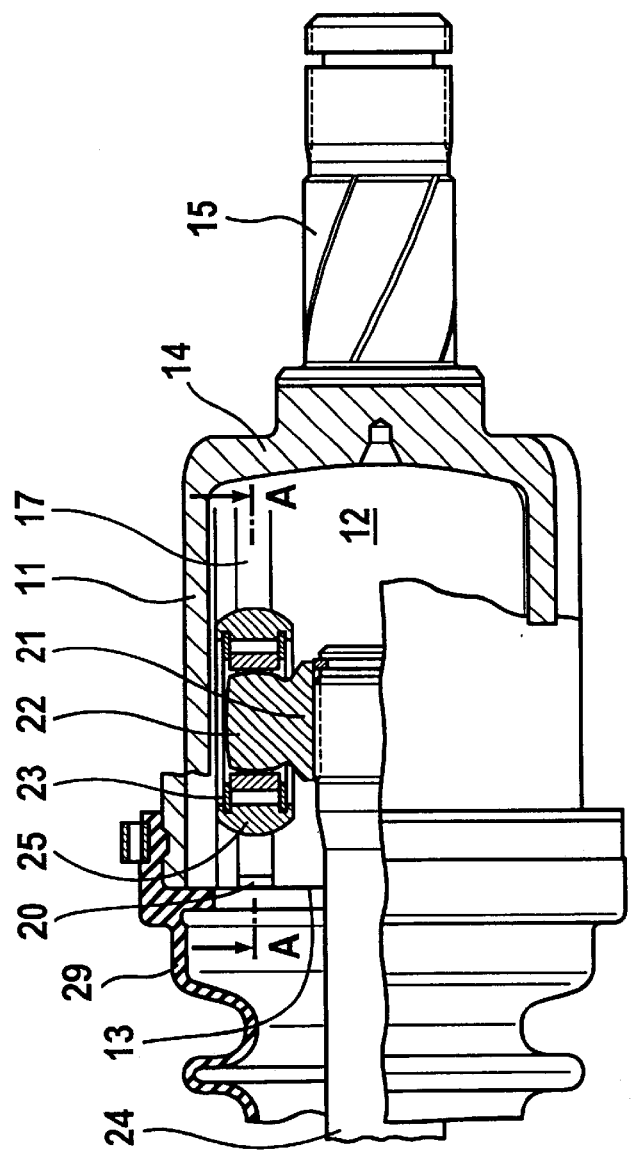
FIG. 1 is a longitudinal partial cross section through a tripode joint designed in accordance with the present invention.

FIGS. 1 and 2 will be described jointly below. They show a tripode joint 9 having an outer joint part 11 in the form of a hollow cylinder with a three-wing cross-section (see FIG. 2) which forms a hollow chamber 12 having an aperture 13 at a first end and a base 14 at the opposite end. Base 14 is followed by a shaft journal 15. The hollow chamber 12 is defined by three uniformly circumferentially distributed recesses 16 which each include two circumferentially opposed, longitudinally extending tracks 17. An inner joint part 21 is positioned in the hollow chamber 12 and comprises circumferentially distributed tripode arms 22 which hold roller assemblies 23 in such a way that they can be articulated.

A driveshaft 24 is inserted into the inner joint part 21. The roller assembly 23 form-fittingly engages the recess 16, with an outer roller 25 being in rolling contact with the tracks 17. On the outer joint part 11, in the vicinity of the aperture 13, there is secured a convoluted boot 29 which extends over the outside of the outer joint part 11 and which seals the space between the outer joint part 11 and the driveshaft 24.

In an end face 18 of the outer joint part 11, at the first end adjacent the aperture 13 there are arranged a plurality of caulkings 19, which form raised portions 20 relative to the respective tracks 7. Raised portions 20 reduce the free inner cross-section of the recesses 16 in the hollow chamber 12. The roller assemblies 23 can be introduced in a nondestructive way into the hollow chamber 12 between the raised portions 20.

In the embodiment shown, the raised portions 20 co-operate directly with the outer rollers 25. Alternatively, the raised portions 20 can be provided between each recess 16 where they act on the inner joint part 21. When the roller assemblies 23 are first introduced into hollow chamber 12, the raised portions 20 are either plastically and elastically deformed, resulting in a partial spring-back, or the raised portions 20 are deformed elastically only, which results in a complete spring-back. The response of raised portions 20 depends on whether the caulkings 19 are unhardened or hardened. Thus, the raised portions 20 function to retain the roller assemblies 23 and associated inner joint part 21 within the outer part 11 after assembly. In the case of a joint wherein the caulkings 19 are produced only after the inner joint part 21 has been introduced into the outer joint part 11, the above has to be applied analogously to a first dismantling operation carried out intentionally.

FIG. 3 shows a partial cross section along Line A—A of FIG. 1 of one of the recesses 16 of the outer joint part 11. Recess 16 comprises opposed tracks 17 and roller assembly 23, shown in the form of a detail, is in contact with the raised portions 20. The raised portions 20 have been formed by caulkings 19 identifiable at one end of the outer joint part 11. At the roller assembly 23, next to the outer roller 25, there can be seen a needle bearing 26 and an inner roller 27. The respective tripode arm 22 is not shown.

FIG. 4a shows caulkings 19 which approximately linearly follow the cross-sectional shape of the tracks 17 therebehind and which can be produced by a chisel-like tool.

In FIG. 4b, each track 17, in its edge regions, is shown to have two caulkings 19' which can be produced by two mandrel-like tools indicated by dashed lines in the cross-section at 10.

FIG. 4c shows caulkings 19" which are located centrally relative to each track 17 positioned therebehind and which can be produced by a larger mandrel-like tool whose cross-sectional shape is also indicated by dashed lines at 10'.

Figure 6:
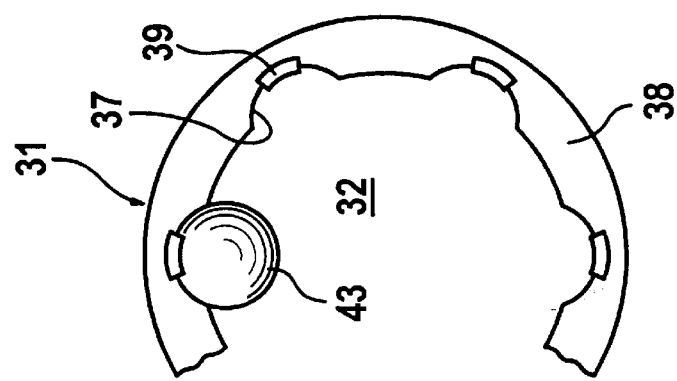
FIG. 6 is a partial cross section through a joint designed according to FIG. 5.
Figure 5:
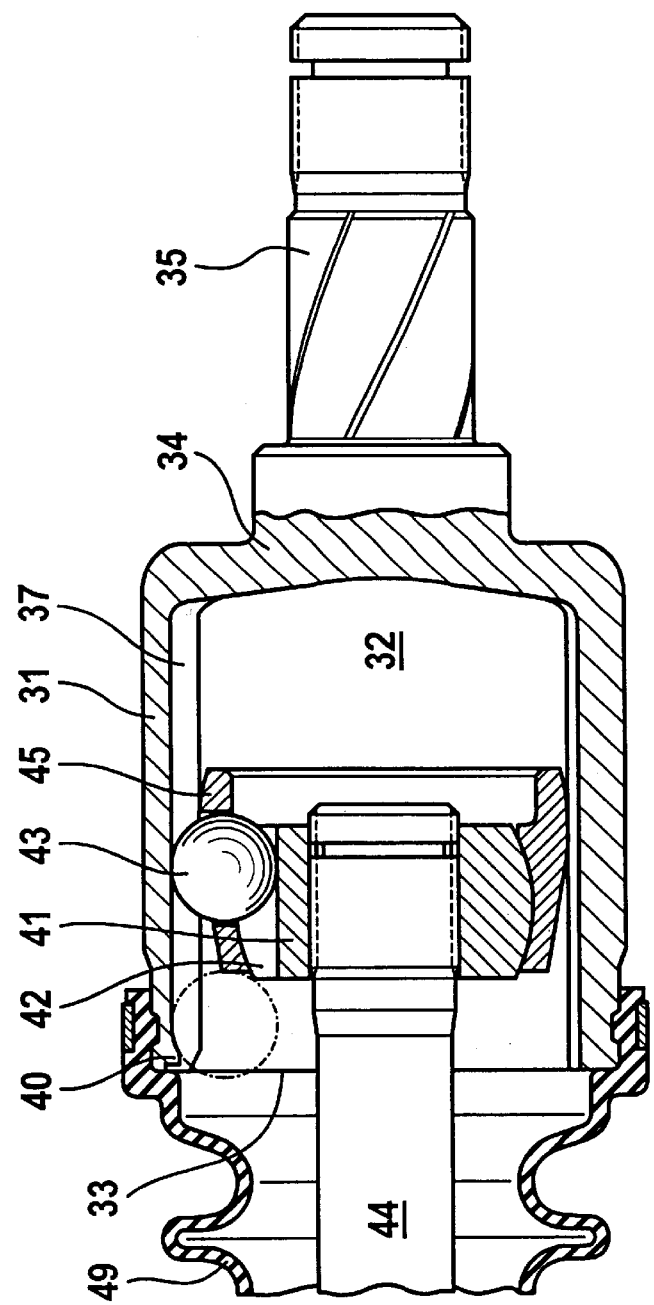
FIG. 5 is a longitudinal partial cross section through a constant velocity DO ball joint designed in accordance with the present invention.

FIGS. 5 and 6 will be described jointly below. They show a DO-joint 70 having an outer joint part 31 in the form of a hollow cylinder with an annular cross-section. Outer joint part 31 forms a hollow chamber 32 with an aperture 33 at a first end and a base 34 at the opposite end. Base 34 is followed by a shaft journal 35. The hollow chamber 32 includes six uniformly circumferentially distributed, longitudinally extending tracks 37. An inner joint part 41 is positioned in the hollow chamber 32 and includes circumferentially distributed tracks 42. The tracks 37 and 42 receive balls 43 which are held by a ball cage 45. A driveshaft 44 is inserted into the inner joint part 41.

On the outer joint part 31, in the vicinity of the aperture 33, there is secured a convoluted boot 49 which extends over the outside of the outer joint part 31 and which seals the space between the outer joint part 31 and the driveshaft 44. In an end face 38 of the outer joint part 31, at the first end adjacent the aperture 33 there are arranged caulkings 39 which, inside their respective track 37, form raised portions 40 that reduce the free inner cross-section of the hollow chamber 32.

The inner joint part 41 with the pre-assembled ball cage 45 and the inserted balls 43 can be inserted between and through said raised portions 40 into the hollow chamber 32 in a nondestructive way. In the embodiment shown, the raised portions 40 co-operate directly with the balls 43 to retain the assembly in the hollow chamber 32. The raised portions 40 can instead be placed at a location on end face 38 between two tracks 37 to act on the ball cage 45. When the inner joint part 41 with pre-assembled ball cage 45 and the inserted balls 43 are first introduced, the raised portions 40 are either plastically and elastically deformed, resulting in a partial spring back, or the raised portions 40 are deformed elastically only, which results in a complete springback. Again, the response depends on whether the caulkings 39 are unhardened or hardened. Thus, caulkings 39 retain the inner joint part 41 and associated assemblies within outer joint part 31.

Figure 7:
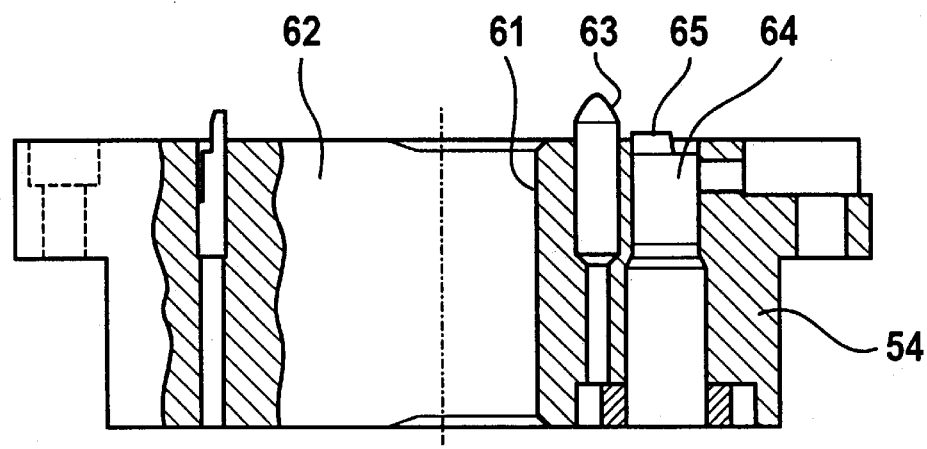
FIG. 7 shows a caulking tool for producing caulkings on an outer joint part of a joint designed in accordance with the present invention.
Figure 8:
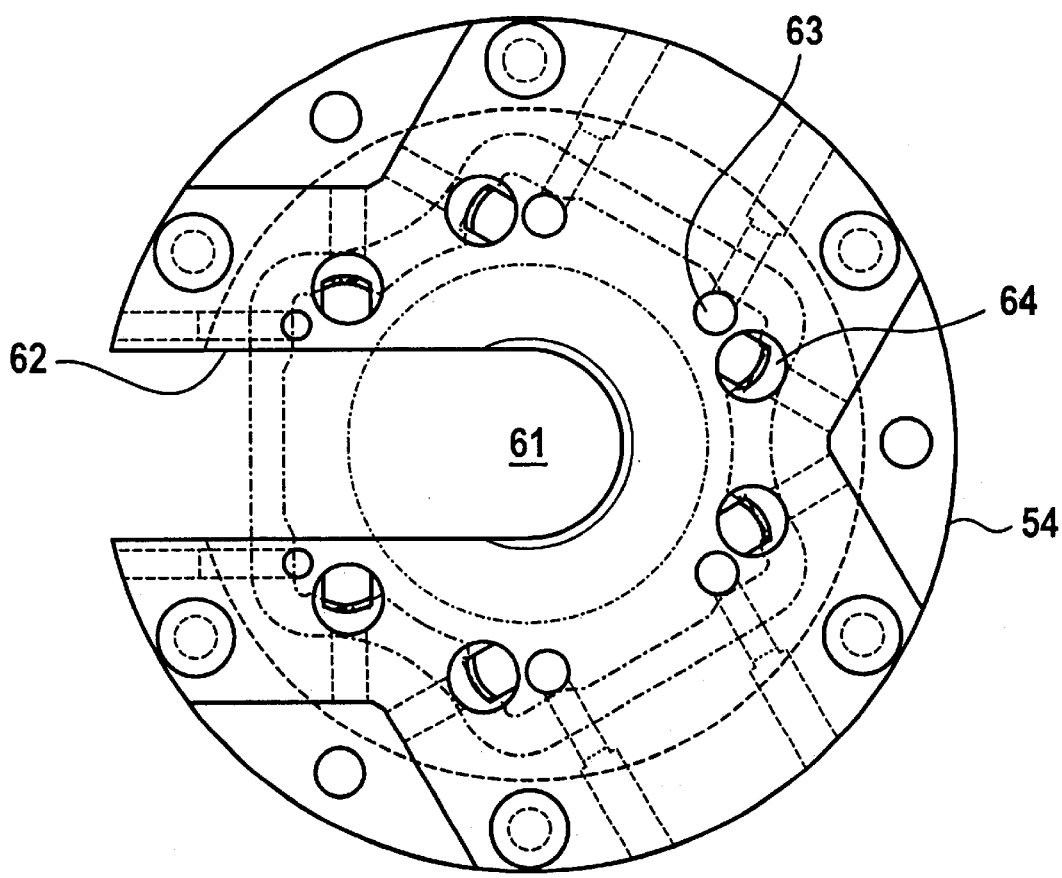
FIG. 8 shows the caulking tool of FIG. 7 in an axial view.

FIGS. 7 and 8 will be described jointly below. They show a punch plate 54 comprising a central bore 61 with a radial slot 62 for laterally introducing and receiving a shaft shank. Into the plate 54 there are inserted centering pins 63 on which it is possible to center an outer joint part 11 of a tripode joint 9 (a cross section of which is shown in phantom lines in FIG. 8) in a centric and angularly defined position, when it is axially pressed against thereagainst. Furthermore, six wedge-type tools 64 with chisel-like blades 65 are inserted into the upper plate 54. The tools 64 project only slightly beyond a surface 72 of the plate 54 and which, when an outer joint part 11 is pressed on to the surface 72 of the plate 54, produce caulkings 39 in the region of the tracks 13, 37 of the outer joint part 11 or 31.

What is claimed is:

1. A constant velocity plunging joint comprising:
  an outer joint part (11, 31) having a cylindrical hollow chamber (12, 32) with an aperture (13, 33) at a first end and being closed by a base (14, 34) at an opposite end and further including uniformly circumferentially distributed, longitudinally extending tracks (17, 37);
  an inner joint part (21, 41) positioned centrally in said cylindrical hollow chamber (12, 32) of said outer joint part (11, 31) so as to be angularly movable and longitudinally displaceable;
  an assembly comprising said inner joint part (21, 41) and a plurality of torque transmitting elements (23, 43);
  said torque transmitting elements (23, 43) which, in the direction of rotation, are form-fittingly connected to said inner joint part (21, 41) and which, in the direction of rotation, engage said tracks (17, 37) of said outer joint part (11, 31) form-fittingly and so as to roll therein in a longitudinal direction;
  said aperture (13, 33) of said outer joint part (11, 31), having an end face (18, 38) including a plurality of caulkings (19, 39) which form raised portions (20, 40), said caulkings (19, 39) reducing the free inner cross-section of said cylindrical hollow chamber (12, 32);
  said assembly received through said aperture (13, 33) into said hollow chamber (12, 32); and
  said raised portions (20, 40) being permanently unhardened and adapted to deform elastically and plastically as said assembly is first introduced into said hollow chamber (12, 32) through said aperture (13, 33), said raised portions (20, 40) exerting an axial holding force on said assembly (23, 43), to prevent any self-acting dismantling.

2. A constant velocity plunging joint comprising:
  an outer joint part (11, 31) having a cylindrical hollow chamber (12, 32) with an aperture (13, 33) at a first end and being closed by a base (14, 34) at an opposite end and further including uniformly circumferentially distributed, longitudinally extending tracks (17, 37);
  an inner joint part (21, 41) positioned centrally in said cylindrical hollow chamber (12, 32) of said outer joint part (11, 31) so as to be angularly movable and longitudinally displaceable;
  an assembly comprising said inner joint part (21, 41) and a plurality of torque transmitting elements (23, 43);
  said torque transmitting elements (23, 43) which, in the direction of rotation, are form-fittingly connected to said inner joint part (21, 41) and which, in the direction of rotation, engage said tracks (17, 37) of said outer joint part (11, 31) form-fittingly and so as to roll therein in a longitudinal direction;
  said aperture (13, 33) of said outer joint part (11, 31), having an end face (18, 38) including a plurality of caulkings (19, 39) which form raised portions (20, 40), said caulkings (19, 39) reducing the free inner cross-section of said cylindrical hollow chamber (12, 32) said assembly received through said aperture (13, 33) into said hollow chamber (12, 32); and
  said raised portions (20, 40) being hardened and adapted to deform only elastically as said assembly is first introduced into said hollow chamber (12, 32) through said aperture (13, 33), said raised portions (20, 40) exerting an axial holding force on said assembly (23, 43), to prevent any self-acting dismantling.

3. A joint as recited in either claims 1 or 2, wherein said joint comprises a tripode joint and wherein said tracks comprise recesses (16) with two opposed running faces (17) and wherein said torque transmitting elements (23) are tripode rollers (25) each supported on a tripode arm (22) of said inner joint part (21), and wherein at least on one of said running faces (17) of each of said recesses (16), there is provided a caulking (19).

4. A joint as recited in either claims 1 or 2, wherein said joint comprises a universal ball joint and wherein said tracks are approximately semi-circular ball grooves (37) and wherein said torque transmitting elements are balls (43) guided in said ball grooves (37) in said outer joint part (31) and in ball grooves (42) of said inner joint part (41) and are held by a cage (45) in a common plane, and said caulkings (39) are provided on at least three of said ball grooves (37) in said outer joint part (31).

* * * * *